United States Patent
Yamada et al.

(10) Patent No.: US 7,529,549 B2
(45) Date of Patent: May 5, 2009

(54) PROVIDING GEOGRAPHICAL DATA IN RESPONSE TO A REQUEST FROM A COMMUNICATION TERMINAL

(75) Inventors: Kazuhiro Yamada, Kanagawa (JP); Hideaki Kawasaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 727 days.

(21) Appl. No.: 11/128,367

(22) Filed: May 13, 2005

(65) Prior Publication Data
US 2005/0266856 A1 Dec. 1, 2005

(30) Foreign Application Priority Data
May 13, 2004 (JP) ............................. 2004-143701

(51) Int. Cl.
*H04W 24/00* (2006.01)
*G06F 15/16* (2006.01)

(52) U.S. Cl. ............... 455/456.1; 455/456.2; 455/456.3

(58) Field of Classification Search ............. 455/456.1, 455/456.2, 456.3, 456.5, 456.6; 709/206, 709/200, 203, 204, 246; 701/1, 23, 24
See application file for complete search history.

(56) References Cited

U.S. PATENT DOCUMENTS

| 7,085,629 | B1 * | 8/2006 | Gotou et al. .................. 701/1 |
| 2002/0129109 | A1 * | 9/2002 | Nozaki et al. ............... 709/206 |

FOREIGN PATENT DOCUMENTS

| JP | 2002-328600 | 11/2002 |
| JP | 2003-114615 | 4/2003 |
| JP | 2004-005711 | 1/2004 |

* cited by examiner

*Primary Examiner*—Melur Ramakrishnaiah
(74) *Attorney, Agent, or Firm*—Oblon, Spivak, McClelland, Maier & Neustadt, P.C.

(57) ABSTRACT

An apparatus, method, program, and product, each capable of providing geographical data in response to a request from a communication terminal. The geographical data providing apparatus may provide geographical data, according to spatial data and command data received from the communication terminal. The geographical data providing apparatus may provide geographical data, according to keyword data and command data received from the communication terminal.

21 Claims, 17 Drawing Sheets

| ID | LONGITUDE | LATITUDE | FILE NAME | SCALE |
|---|---|---|---|---|
| 001 | 139° 36′ E | 35° 30′ N | shinyokohama001.jpg | 5 |
| 002 | 139° 36′ E | 35° 30′ N | shinyokohama002.jpg | 4 |
| 003 | 139° 36′ E | 35° 30′ N | shinyokohama003.jpg | 3 |
| 004 | 139° 36′ E | 35° 30′ N | shinyokohama004.jpg | 2 |
| 005 | 139° 36′ E | 35° 30′ N | shinyokohama005.jpg | 1 |
| ... | ... | ... | ... | ... |

HI. THIS IS MARY FROM COSMO OFFICE SERVICE.
ON 24TH, OUR STAFF WILL BE PICKING YOU UP AT ONE OF
THE LOCATIONS.

MEETING TIME     MEETING PLACE
10:00 TO 10:20,  SAKURAGICHO STATION, MAIN GATE
10:20 TO 10:30,  LANDMARK TOWER, THIRD FLOOR
10:30 TO 10:40,  QUEENS SQUARE MALL, MAIN ENTRANCE

IF YOU CANNOT MAKE ANY ONE OF THE ABOVE TIMES,
YOU WILL HAVE TO MAKE YOUR OWN WAY TO THE PACIFICO
YOKOHAMA CONVENTION CENTER. SO, BE THERE ON TIME !

MARY
COSMO OFFICE SERVICE
LOCATIONS
MEETING TIME
MEETING PLACE
SAKURAGICHO STATION
MAIN GATE
LANDMARK TOWER
THIRD FLOOR
QUEENS SQUARE MALL
MAIN ENTRANCE
PACIFICO YOKOHAMA CONVENTION CENTER

FIG. 18

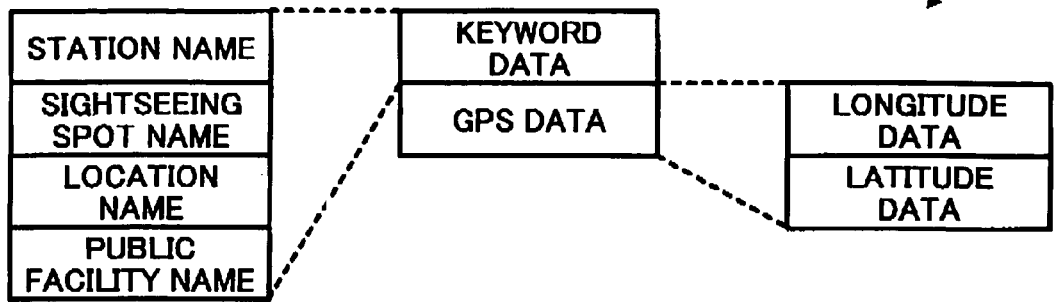

KD

| STATION NAME |
| SIGHTSEEING SPOT NAME |
| LOCATION NAME |
| PUBLIC FACILITY NAME |

| KEYWORD DATA |
| GPS DATA |

| LONGITUDE DATA |
| LATITUDE DATA |

| STATION NAME | LONGITUDE | LATITUDE |
|---|---|---|
| TOKYO | 139° 46′ E | 35° 40′ N |
| SHINJUKU | 139° 42′ E | 35° 41′ N |
| IKEBUKURO | 139° 42′ E | 35° 43′ N |
| UENO | 139° 46′ E | 35° 42′ N |
| SHIBUYA | 139° 42′ E | 35° 39′ N |
| ... | ... | ... |

| SIGHTSEEING SPOT NAME | LONGITUDE | LATITUDE |
|---|---|---|
| YAMASHITA PARK | 139° 38′ E | 35° 26′ N |
| CHINA TOWN | 139° 39′ E | 35° 26′ N |
| MINATO MIRAI | 139° 38′ E | 35° 27′ N |
| SANKYO PARK | 139° 39′ E | 35° 24′ N |
| BAY BRIDGE | 139° 39′ E | 35° 22′ N |
| ... | ... | ... |

PROVIDING GEOGRAPHICAL DATA IN RESPONSE TO A REQUEST FROM A COMMUNICATION TERMINAL

CROSS-REFERENCE TO RELATED APPLICATIONS

This patent specification is based on and claims priority to Japanese patent application No. 2004-143701, filed on May 13, 2004, in the Japanese Patent Office, the entire contents of which are hereby incorporated herein by reference.

DISCUSSION OF THE BACKGROUND

1. Field of the Invention

The following disclosure generally relates to providing geographical data in response to a request received from a communication terminal.

2. Background of the Invention

Recently, some mobile phones are provided with a GPS (Global Position System) receiver, capable of obtaining GPS data indicating the location of a selected place. However, to display or print a map showing the location, the mobile phone needs to connect to a map providing server as an authorized user, and to input an instruction for displaying or printing.

On the other hand, mobile phones without the GPS receiver are not able to obtain GPS data, and thus are not capable of displaying or printing a map.

SUMMARY OF THE INVENTION

Exemplary embodiments of the present invention include an apparatus, system, method, program, and product, each capable of providing geographical data in response to a request received from a communication terminal.

In one exemplary embodiment, the geographical data providing apparatus receives email data including spatial data and command data from a communication terminal. The geographical data providing apparatus analyzes the command data, and searches a geographical database for at least one geographical data item corresponding to the spatial data according to the command data.

Further, the geographical data providing apparatus may output the searched geographical data according to the command data.

In another exemplary embodiment, the geographical data providing apparatus receives email data including keyword data and command data from a communication terminal. The geographical data providing apparatus analyzes the command data, and extracts at least one keyword from the keyword data. The geographical data providing apparatus further searches a keyword data database for spatial data corresponding to the extracted keyword, and searches a geographical database for at least one geographical data item corresponding to the searched spatial data.

Further, the geographical data providing apparatus may output the searched geographical data according to the command data.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 16 is a view illustrating exemplary keyword data;

FIG. 17 is a view illustrating a plurality of keywords extracted from the exemplary keyword data shown in FIG. 16;

FIG. 18 is a table illustrating exemplary data items stored in a keyword database according to an exemplary embodiment of the present invention;

FIG. 19 is a table illustrating exemplary data items stored in a keyword database according to an exemplary embodiment of the present invention;

FIG. 20 is a table illustrating exemplary data items stored in a keyword database according to an exemplary embodiment of the present invention.

DETAILED DESCRIPTION OF THE PREFERRED EMBODIMENTS

Figure 1:
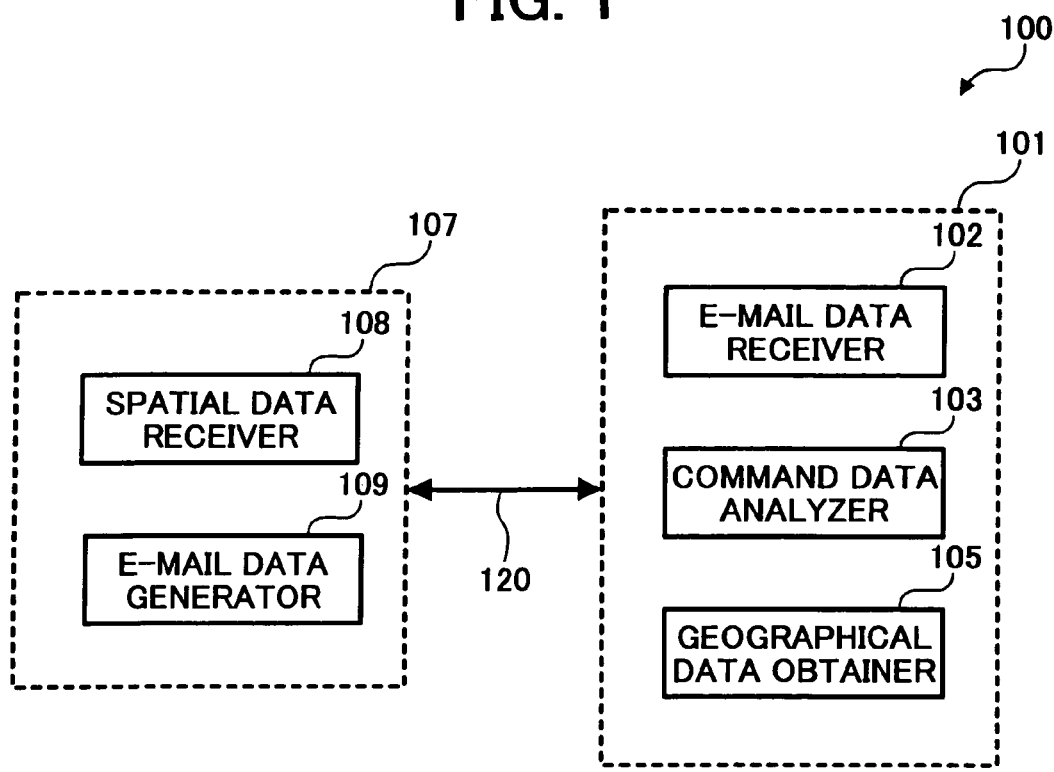
FIG. 1 is a schematic block diagram illustrating a functional structure of a geographical data providing system according to an exemplary embodiment of the present invention.

In describing preferred embodiments illustrated in the drawings, specific terminology is employed for clarity. However, the disclosure of this patent specification is not intended to be limited to the specific terminology selected and it is to be understood that each specific element includes all equivalents that operate in a similar manner. Referring now to the drawings, wherein like reference numerals designate identical or corresponding parts throughout the several views, FIG. 1 illustrates a geographical data providing system 100 according to an exemplary embodiment of the present invention.

The geographical data providing system 100 includes a geographical data providing apparatus 101 and a communication terminal 107, which are connected to each other via a network 120, such as the Internet, for example. The geographical data providing apparatus 101 includes an email data receiver 102, a command data analyzer 103, and a geographical data obtainer 105. The communication terminal 107 includes a spatial data receiver 108 and an email data generator 109.

The spatial data receiver 108 obtains spatial data of a selected place. For example, the spatial data receiver 108 may be implemented by a GPS receiver, capable of obtaining GPS data from the GPS.

The email data generator 109 generates email data including the spatial data and command data. The command data includes any kind of information indicating a desired operation determined by a user. The email data is sent to the geographical data providing apparatus 101 via the network 120.

The email data receiver 102 receives the email data, including the spatial data and the command data.

The command data analyzer 103 analyzes the command data, which indicates the desired operation. The desired operation includes any kind of operation, including searching, storing, faxing, printing, displaying, sending, or image processing, for example.

The geographical data obtainer 105 obtains geographical data corresponding to the spatial data. In this exemplary embodiment, the geographical data includes any kind of information that can be derived from the spatial data, such as a map showing the location of the selected place, for example. Preferably, the geographical data is obtained by searching a geographical database available to the geographical data providing apparatus 101.

Figure 2:
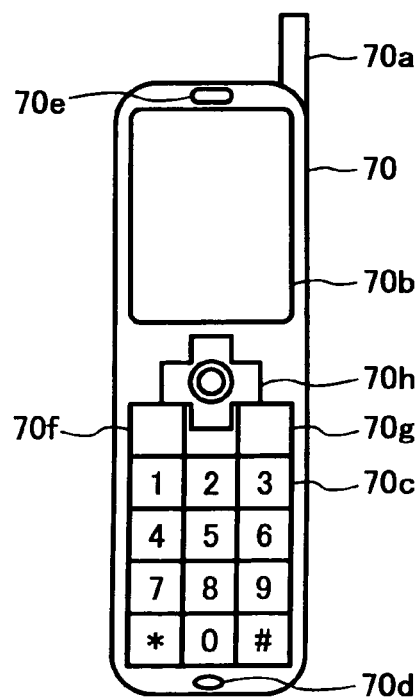
FIG. 2 is a schematic front view illustrating an exemplary outer appearance of a communication terminal shown in FIG. 1, according to an exemplary embodiment of the present invention.

The communication terminal 107 may be preferably implemented by a mobile phone 70 illustrated in FIG. 2, for example.

As shown in FIG. 2, the mobile phone 70 includes an antenna 70a, a display 70b, a ten key 70c, a voice transmitter 70d, a voice receiver 70e, an email key 70f, a function key 79g, and a cursor key 70h. Although not shown, the mobile phone 70 further includes a GPS receiver, capable of obtaining GPS data from the GPS.

The antenna 70a transmits or receives data to or from a network. The display 70b includes any kind of device capable of displaying various information, such as an LCD (liquid crystal display), for example. The ten key 70c allows a user to input information, such as numerals, alphabets, or symbols. The voice transmitter 70d includes any kind of device capable of sending a user's voice to a network, such as a microphone.

The voice receiver 70e includes any kind of device capable of receiving a voice from the network and transmitting it to the user, such as a speaker. The email key 70f calls a function of generating, sending, or receiving email data. The function key 70g calls various functions operable by the mobile phone 70, such as a function of obtaining GPS data. The cursor key 70h controls contents to be displayed on the display 70b, by moving a pointer on the display 70b, for example.

Figure 3:
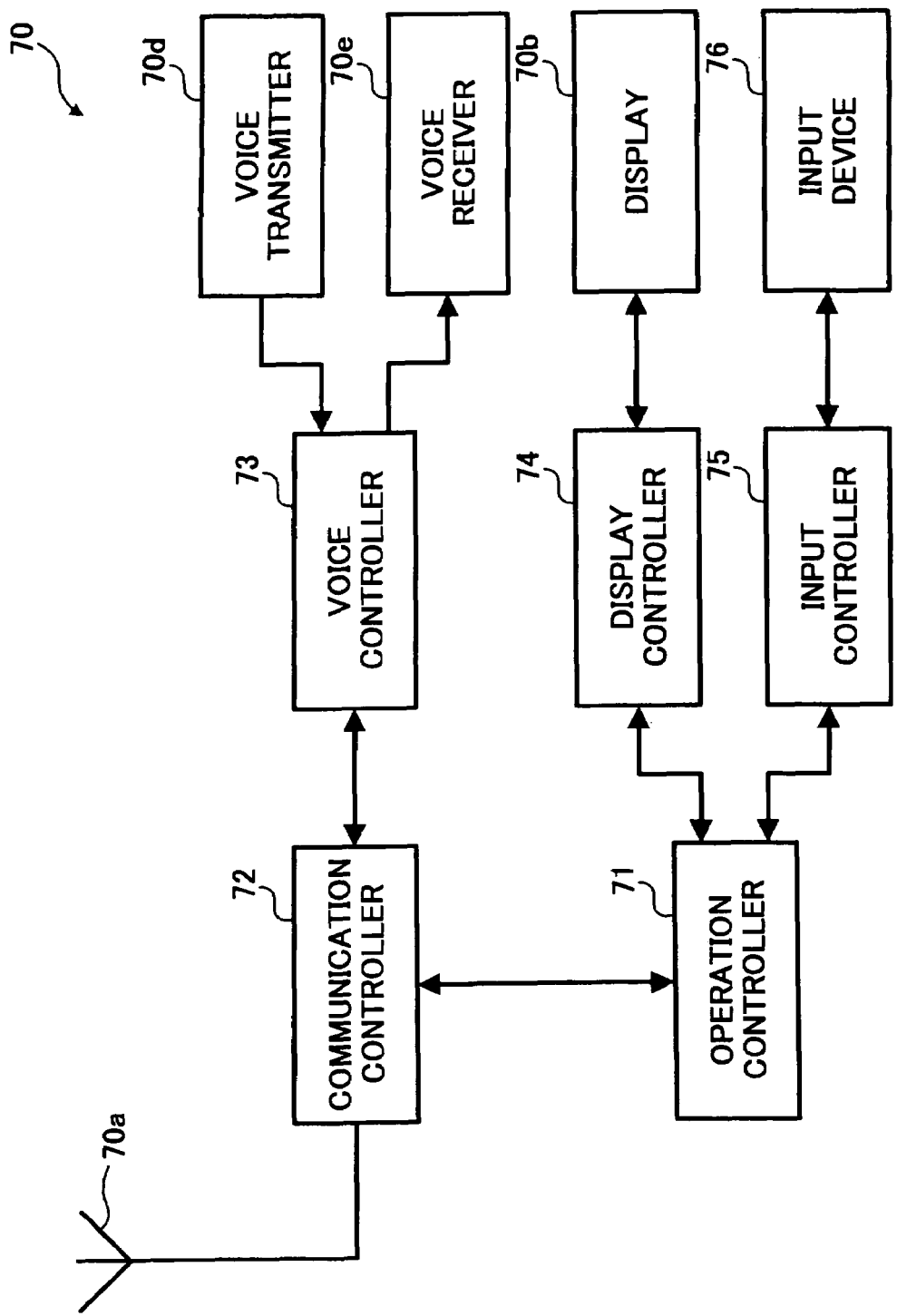
FIG. 3 is a schematic block diagram illustrating an exemplary structure of a control system incorporated in the communication terminal shown in FIG. 2.

FIG. 3 is a block diagram illustrating an exemplary structure of a control system incorporated in the mobile phone 70. Referring to FIG. 3, the control system of the mobile phone 70 includes an operation controller 71, a communication controller 72, a voice controller 73, a display controller 74, and an input controller 75.

The operation controller 71 includes any kind of device capable of controlling an operation of the mobile phone 70. The communication controller 72 includes any kind of device capable of controlling transmission or reception of data, including email data and voice data, for example. The voice controller 73 includes any kind of device capable of controlling transmission or reception of voice data, through the voice transmitter 70d and the voice receiver 70e. The display controller 74 includes any kind of device capable of controlling a display of the display 70b. The input controller 75 includes any kind of device capable of controlling an input made to the mobile phone 70 through an input device 76, which includes the ten key 70c, email key 70f, function key 70g, and cursor key 70h.

Alternatively, the communication terminal 107 of FIG. 1 may be implemented by a mobile computer such as a PDA (personal digital assistance), a notebook computer, etc. as long as it has a function of receiving spatial data and a function of sending email data.

Figure 4:
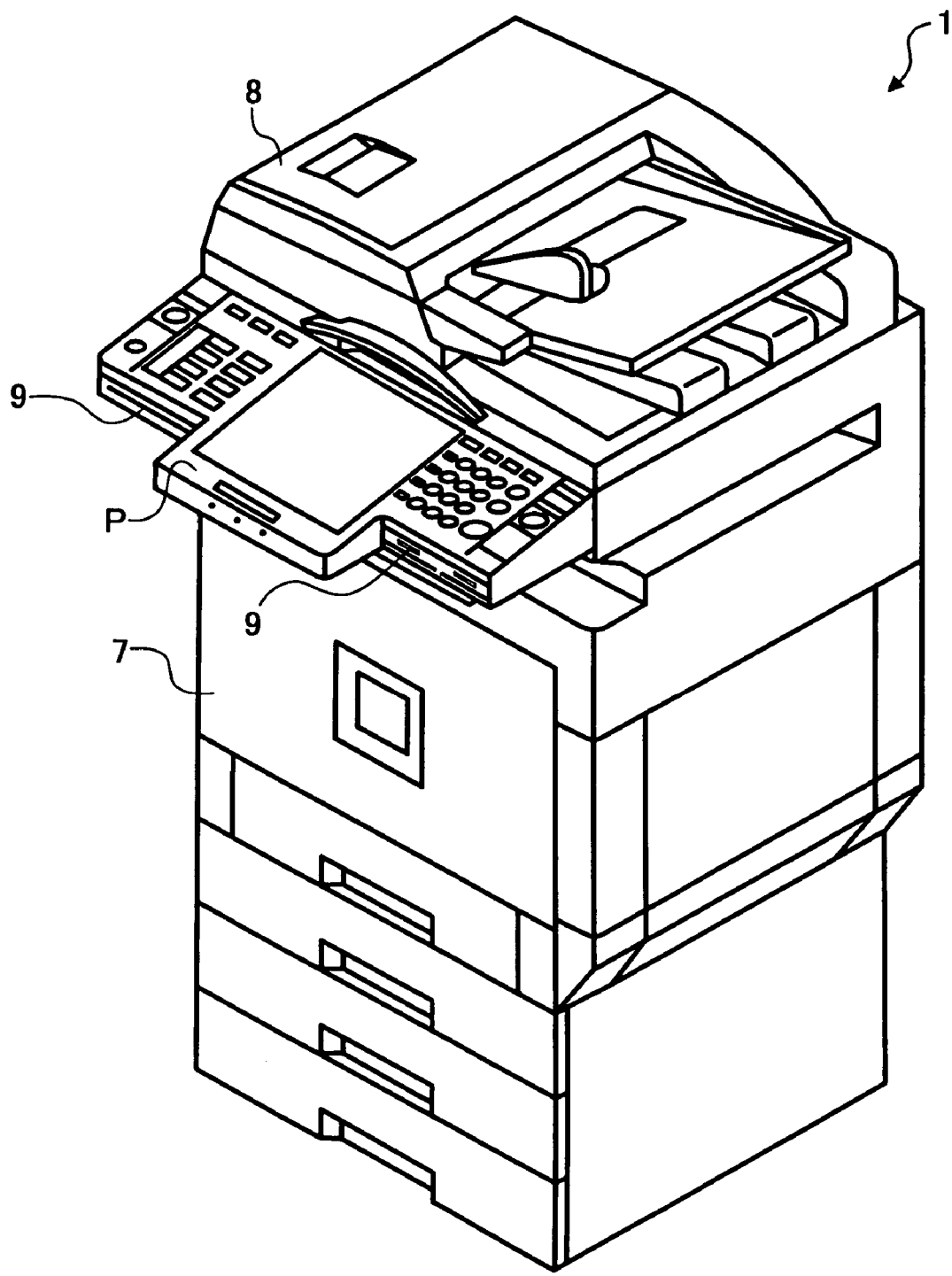
FIG. 4 is a perspective view illustrating an exemplary outer appearance of a geographical data providing apparatus shown in FIG. 1, according to an exemplary embodiment of the present invention.

The geographical data providing apparatus 101 of FIG. 1 may be preferably implemented by a multifunctional apparatus (MFP) 1 shown in FIG. 4, for example.

The MFP 1 may look like a copier having a reader 8 at the top surface, a printer 7 in its inside, and an operational panel P. The MFP 1 is further provided with a removable media controller 9, which reads or writes data from or onto a recording medium. With this configuration, the MFP 1 is capable of scanning, copying, faxing, or printing an original image. The MFP 1 is also capable of storing data in a memory, or sending data through a network.

In addition to the above-described functions, the MFP 1 may be provided with any one of functions including web browsing, document browsing, page browsing, searching, editing, system monitoring, etc.

Figure 5:
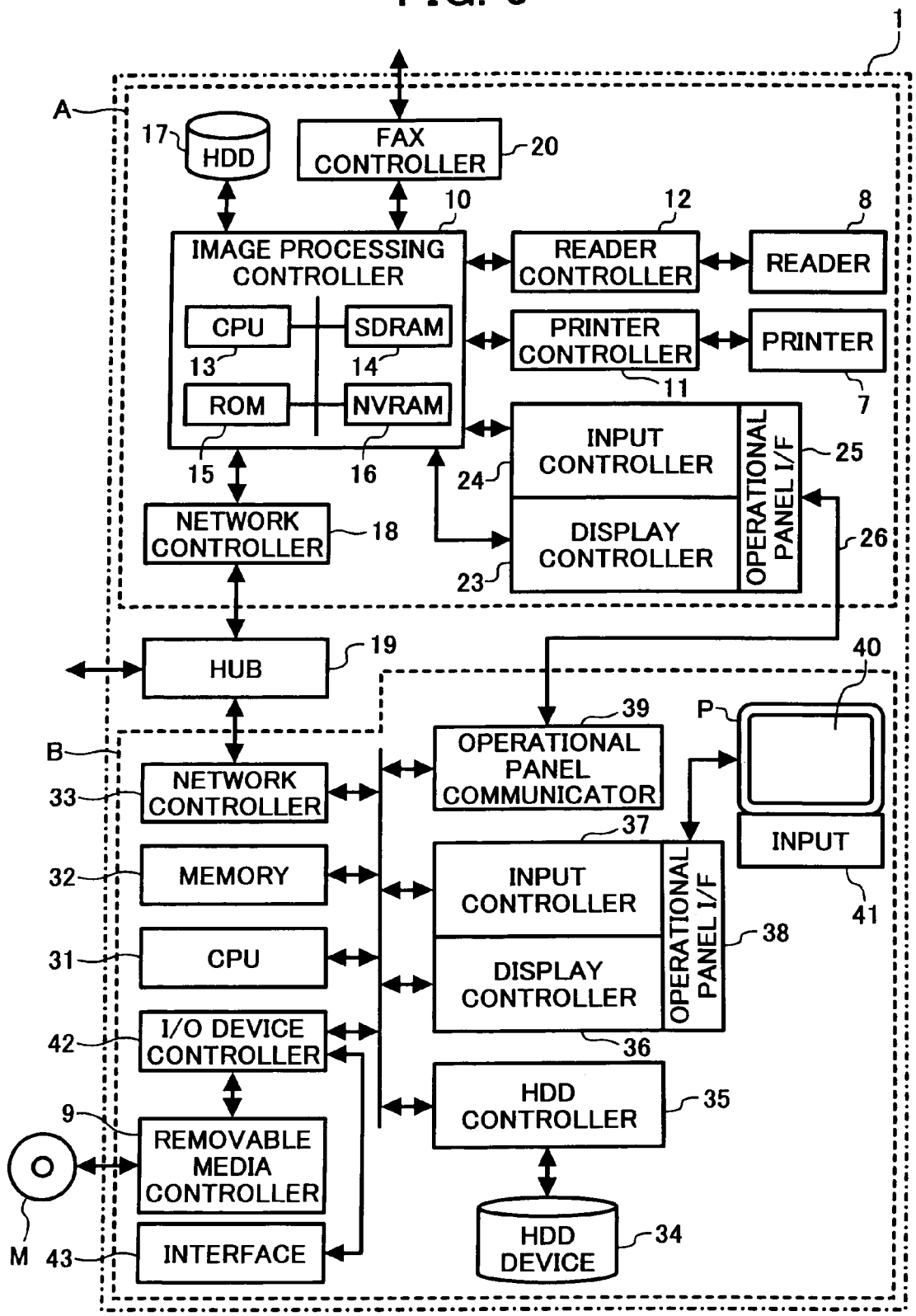
FIG. 5 is a schematic block diagram illustrating an exemplary structure of the geographical data providing apparatus shown in FIG. 4.

Referring to FIG. 5, the MFP 1 includes an image processing unit A and an information processing unit B, which are connected to each other via a hub 19. Alternatively, the image processing unit A and the information processing unit B may be connected via any other communication device, such as a switch or a switching hub, for example.

The image processing unit A includes the reader 8, the printer 7, a reader controller 12, a printer controller 11, an image processing controller 10, a HDD (hard disk drive) 17, a fax controller 20, a network controller 18, an input controller 24, a display controller 23, and an operational panel I/F (interface) 25.

The information processing unit B includes a network controller 33, a memory 32, a CPU 31, an I/O (input/output) device controller 42, the removable media controller 9, an interface 43, an operational panel communicator 39, an input controller 37, a display controller 36, an operational panel I/F 38, the operational panel P having a display 40 and an input 41, a HDD controller 35, and a HDD 34.

The reader 8 includes any kind of device capable of reading an original image into image data, such as a scanner, for example.

The printer 7 includes any kind of device capable of forming an image on a recoding medium, such as an image forming device, for example. In this exemplary embodiment, the printer 7 can form a full color image, using any one of image forming methods including electrophotography, ink-jet, dye sublimation transfer, silver salt photography, thermal recording, thermal transfer, etc.

The reader controller 12 includes any kind of device capable of controlling an operation of the reader 8, according to an instruction received from the image processing controller 10. For example, upon receiving an instruction for reading from the image processing controller 10, the reader controller 12 causes the reader 8 to irradiate a light to a surface of an original image, and converts the reflected light to image data, such as 8-bit RGB data if the original image is in color.

The printer controller 11 includes any kind of device capable of controlling an operation of the printer 7, according to an instruction received from the image processing controller 10. For example, upon receiving an instruction for printing from the image processing controller 10, the printer controller 11 causes the printer 7 to form a toner image on a recording medium.

The image processing controller 10 includes any kind of device capable of controlling image processing performed by the image processing unit A, such as a microcomputer. As shown in FIG. 5, the image processing controller 10 includes a CPU (central processing unit) 13, a SDRAM (synchronous dynamic random access memory) 14, a ROM (read only memory) 15, and an NVRAM (non-volatile random access memory) 16, which are connected to one another via a bus. The CPU 13 operates as a main processor. The SDRAM 14 stores image data, including image data read by the reader 8, image data to be printed by the printer 7, etc. The ROM 15 stores various programs such as a control program to be operated by the CPU 13 for controlling an operation of the image processing unit A. The NVRAM 16 stores various data, such as job history data or preference data, for example.

The HDD 17, which is connected to the image processing controller 10, includes any kind of storage device capable of storing a large amount of data, including image data, job history data, and program data, for example.

The fax controller 20, which is connected to the image processing controller 10, includes any kind of communication device capable of allowing the image processing unit A to communicate with other devices via a communication network. For example, the fax controller 20 connects the image processing unit A to a PSTN (public switched telephone line) via a PBX (public box exchange). With this configuration, the image processing unit A can receive or send fax data.

The network controller 18, which is connected to the image processing controller 10, includes any kind of communication device capable of allowing the image processing unit A to communicate with other devices via a computer network, such as LAN, through the hub 19.

The input controller 24 generates a display control signal according to an instruction from the image processing controller 10, and sends it to the information processing unit B through the operational panel I/F 25 and a communication cable 26. The display control signal, received by the operational panel communicator 39, is further transmitted to the operational panel P through the display controller 36 and the operational panel I/F 38. The operational panel P displays data according to the display control signal.

The display controller 23 receives an input control signal from the information processing unit B through the communication cable 26 and the operational panel I/F 25.

The CPU 31 includes any kind of processor capable of controlling an operation of the information processing unit B. The memory 32 includes any kind of memory unit, such as a RAM functioning as a work memory for the CPU 31, and a ROM storing various data.

The HDD 34 stores various data, including image data, job history data, preference data, etc. Further, the HDD 34 stores geographical data including a plurality of maps, and information indicating the relationship between the geographical data and spatial data, preferably in a form of database ("geographical database"). Further, it may store various programs, such as an OS (operating system) program, an email controlling program, and a geographical data obtaining program, for example. The HDD controller 35 controls data input or data output of the HDD 34.

The network controller 33 includes any kind of communication device capable of allowing the information processing unit B to communicate with other devices via a computer network, such as LAN, through the hub 19. The network controller 33 is preferably assigned with an IP address different from that of the network controller 18.

The input controller 37 generates an input control signal according to an instruction input by a user through the operational panel P, and sends it to the image processing unit A through the operational panel communicator 39 and the communication cable 26.

The display controller 36 receives a display control signal from the image processing unit A through the communication cable 26 and the operational panel communicator 39.

As described above, the operational panel communicator 39 exchanges data between the image processing unit A and the information processing unit B. To make this exchange possible, the operational panel communicator 39 may perform data conversions, if the image processing unit A and the information processing unit B operate in different formats.

The I/O device controller 42 includes any kind of device capable of controlling an operation of an input or output device connected through the interface 43, such as a digital camera, for example.

The interface 43 includes any kind of interface, such as USB, IEEE1394, or SCSI.

The removable media controller 9 includes any kind of device capable of controlling an operation of a recording medium M, such as an optical disc driver, for example.

The recording medium M includes any kind of recording medium capable of storing various data and programs. Examples include, but are not limited to, optical discs such as CD-ROM, CD-R, CD-RW, DVD-ROM, DVD-RAM, DVD-R, DVD+R, DVD-RW, and DVD+RW, magneto optical discs, memory cards, and flexible disks.

Figure 6:
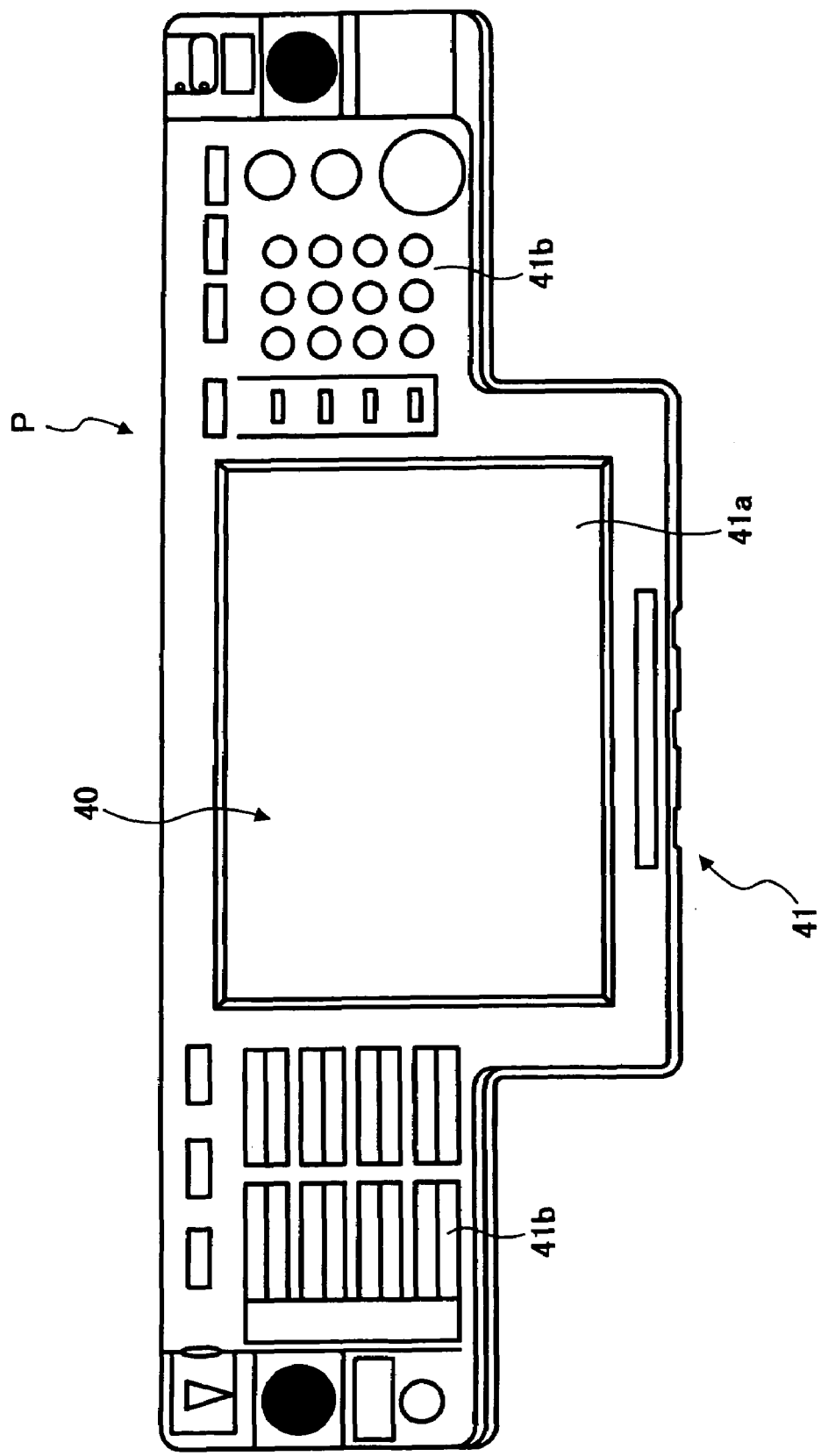
FIG. 6 is a front view illustrating an operational panel of the geographical data providing apparatus shown in FIG. 4.

As shown in FIG. 6, the operational panel P includes the display 40 and the input 41. The display 40 includes any kind of device capable of displaying various information including an instruction received from the image processing unit A, such as an LCD (liquid crystal display), for example.

The input 41 includes any kind of device capable of inputting an instruction from a user, such as a keyboard, for example. In this exemplary embodiment, the input 41 includes a touch panel 41a placed on the surface of the display 40, and a number of keys or buttons 41b.

Figure 7:
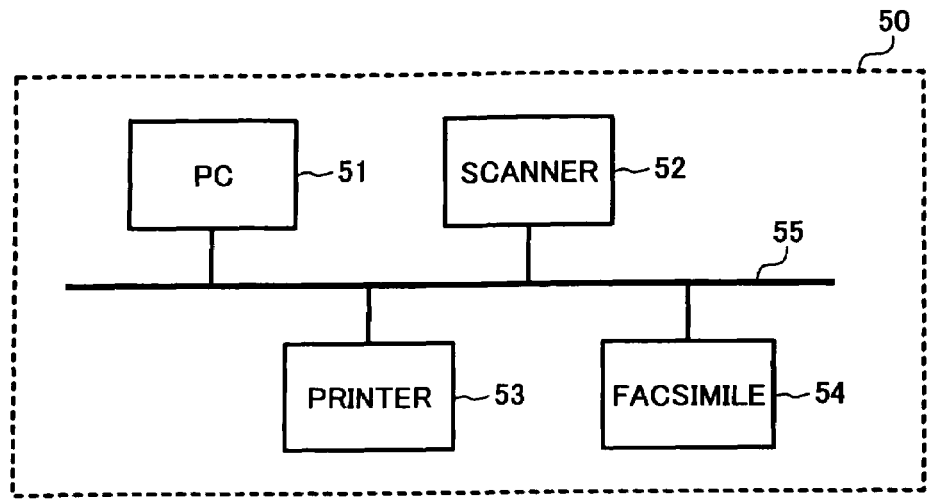
FIG. 7 is a schematic block diagram illustrating a geographical data providing apparatus, according to an exemplary embodiment of the present invention.

Alternatively, the geographical data providing apparatus 101 of FIG. 1 may be implemented by an image processing system 50 illustrated in FIG. 7, for example. The image processing system 50 includes a PC 51, a scanner 52, a printer 53, and a facsimile 54, which are connected to one another via a bus 55.

The PC 51 includes any kind of processor capable of receiving email data including command data and spatial data. The PC 51 further includes any kind of memory device capable of storing various data, including geographical data, geographical base, various computer programs, etc.

Figure 8:
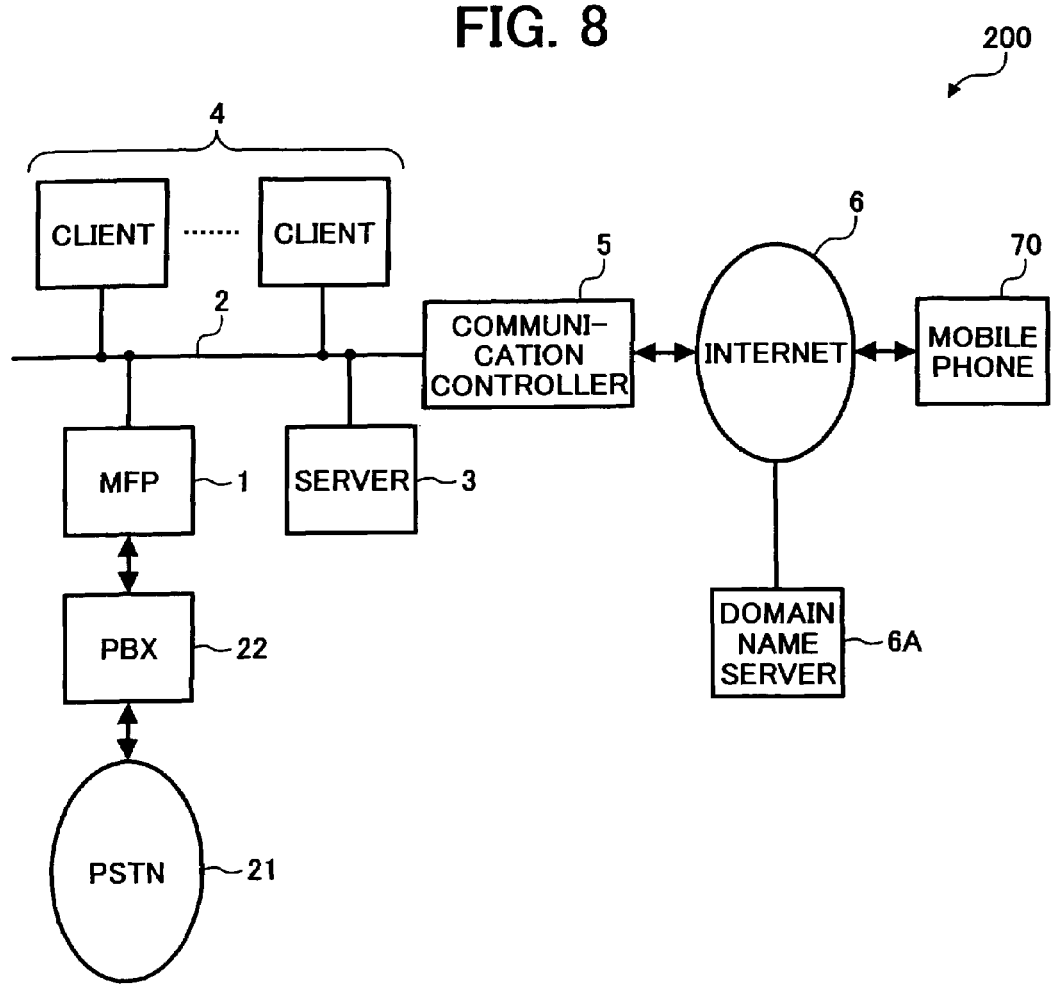
FIG. 8 is a schematic block diagram illustrating a hardware structure of a geographical data providing system according to an exemplary embodiment of the present invention.

FIG. 8 illustrates an exemplary hardware structure of the geographical data providing system 100.

As shown in FIG. 8, the MFP 1 is connected to clients 4 and a server 3 through a local network 2, such as LAN, for example. The clients 4 include one or more personal computers, with each operating as a client. The server 3 includes at least one personal computer, which operates as a server.

In this exemplary embodiment, the local network 2 may be a wireless network using radio frequency or infrared waves, or a wired network such as an optical fiber.

The MFP 1 is further connected to a communication network, such as a PTSN 21 via a PBX 22, as described referring to FIG. 5.

Furthermore, the MFP 1 is connected to a computer network, such as the Internet 6 via a communication controller 5.

The communication controller 5 includes any kind of device capable of connecting the local network 2 to the Internet 6, such as a router, exchanging device, cable modem, DSL modem, etc. In this exemplary embodiment, the communication controller 5 allows the mobile phone 70 to access the MFP 1 on one or more specified ports, using port forwarding. In this exemplary embodiment, a number of ports are set by default, including a port for SMPT with the port number 25, a port for HTTP with the port number 80, a port for FTP with the port number 21, a port for SSH with the port number 22, a port for POP with the port number 110, a port for HTTPS with the port number 443, a port 389 for LDAP with the port number 389, etc. Further, one or more ports may be set according to a user's preference.

Further, the communication controller 5 may be incorporated in the MFP 1.

The Internet 6 is provided with a domain name server 6A, which stores information regarding host names and their corresponding IP addresses in a distributed database on the Internet 6.

Figure 9:
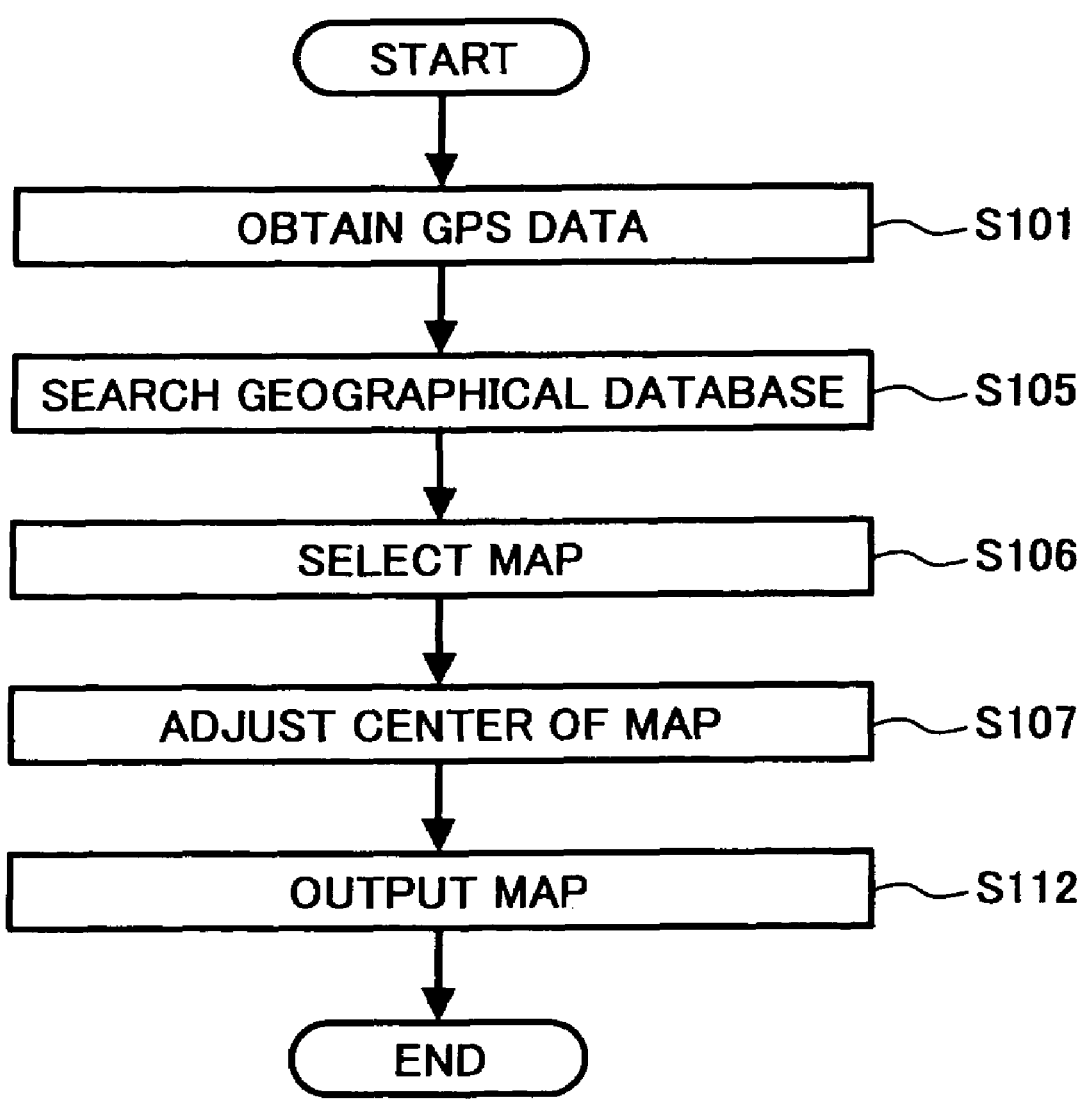
FIG. 9 is a flowchart illustrating an exemplary operation of outputting geographical data, performed by the geographical data providing apparatus shown in FIG. 1.

Referring to FIG. 9, an exemplary operation of outputting geographical data, performed by the MFP 1 of FIG. 8, is explained. The steps shown in FIG. 9 are performed when the MFP 1 receives email data including spatial data and command data, from the mobile phone 70. In this exemplary embodiment, the email data is created by the mobile phone 70 as follows.

First, in step S101, a user calls the function of obtaining GPS data and inputs information regarding a destination place. For example, the user may input a name of the destination place using the ten key 70*c*. Alternatively, the user may browse a list of place names provided on the display 70*b*, and select one place name indicating the destination place using the curser key 70*h*. Alternatively, the user may instruct the mobile phone 70 to obtain a current location of the user.

The mobile phone 70 obtains GPS data corresponding to the destination place, from the GPS through the antenna 70*a*. In this exemplary embodiment, the GPS data includes longitude data indicating the longitude of the destination place, and latitude data indicating the latitude of the destination place.

Next, the user calls the email function by selecting the email key 70*f*, and generates email data including the GPS data and command data. In this exemplary embodiment, the GPS data may be attached to an email message as an attachment file, or it may be included in the body of an email message as a link. The command data may be preferably input in the "TO" field as an email address (or an email account name) as described below.

In one example, if the user wants to print a map of the destination place, the user inputs an email address for printing ("printing email address"), such as "mapprint@imagio385.ricoh.co.jp". The printing email address may be expressed as "printing account name@machine ID.host name.domain name". In this exemplary embodiment, the printing account name is previously determined and stored in the HDD 34, for example, along with information indicating a printing operation to be performed when the printing account name is specified. Alternatively, the printing email address may include a parameter, indicating preference information for printing, such as a number of copies. Alternatively, the printing email address may include a user ID, indicating information of a sender.

In another example, if the user wants to display a map of the destination place on the display 40, the user inputs an email address for displaying ("displaying email address"), such as "mapdisplay@imagio385.ricoh.co.jp". The displaying email address may be expressed as "displaying account name@machine ID.host name.domain name". In this exemplary embodiment, the displaying account name is previously determined and stored in the HDD 34, for example, along with information indicating a displaying operation to be performed when the displaying account name is specified. Alternatively, the displaying email address may include a user ID.

In another example, if the user wants to save a map of the destination place as a data file, the user inputs an email address for storing ("storing email address"), such as "mapsave@imagio385.ricoh.co.jp". The storing email address may be expressed as "storing account name@machine ID.host name.domain name". In this exemplary embodiment, the storing account name is previously determined and stored in the HDD 34, for example, along with information indicating a storing operation to be performed when the storing account name is specified. Alternatively, the storing email address may include a parameter, indicating preference information for storing, such as a folder name. Alternatively, the storing email address may include a user ID, indicating information of a sender.

In another example, if the user wants to fax a map of the destination place, the user inputs an email address for faxing ("faxing email address"), such as "mapfax@imagio385.ricoh.co.jp". The faxing email address may be expressed as "faxing account name@machine ID.host name.domain name". In this exemplary embodiment, the faxing account name is previously determined and stored in the HDD 34, for example, along with information indicating a faxing operation to be performed when the faxing account name is specified. Alternatively, the faxing email address may include a parameter, indicating preference information for faxing, such as a destination phone number. Alternatively, the faxing email address may include a user ID, indicating information of a sender, before the account name.

Figure 10:
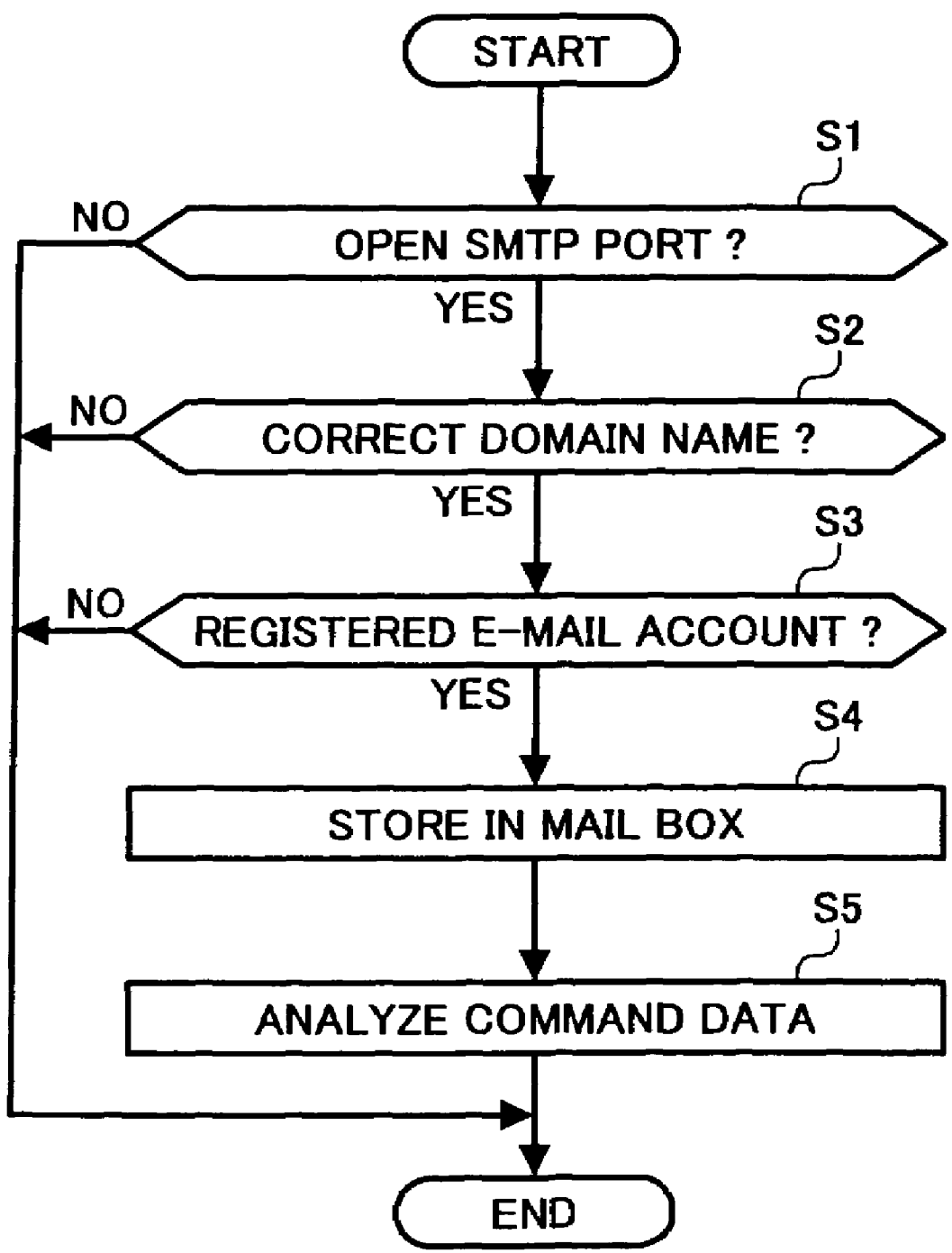
FIG. 10 is a flowchart illustrating an exemplary operation of receiving email data, performed by the geographical data providing apparatus shown in FIG. 1.

Now, referring to FIG. 10, an exemplary operation of receiving email data, performed by the MFP 1, is explained.

Step S1 periodically or constantly checks whether to open or close the SMTP port. When the mobile phone 70 sends email data to the MFP 1 ("Yes" in Step S1), the MFP 1 opens the SMTP port to establish the TCP/IP connection. Otherwise, the process ends to keep the SMTP port closed.

Step S2 checks whether information indicating the machine ID, host name, or domain name of the MFP 1, which has been received from the mobile phone 70, is correct. For example, the MFP 1 compares the received information with information stored in its own memory. If the received information matches with the stored information, the process proceeds to Step S3, otherwise the process ends.

Step S3 checks whether the email account, i.e., the email address, specified by the mobile phone 70, has been registered as a registered email account of the MFP 1. For example, the MFP 1 may search for the specified email account, by referring to preference information stored in the MFP 1. If the specified email account matches with any one of the registered email accounts ("Yes" in Step S3), the process proceeds to Step S4. Otherwise, the process ends.

In this Step S3, the MPF 1 may additionally check authentication of the mobile phone 70.

Step S4 stores the received email data in the mail box corresponding to the specified email account.

Step S5 analyzes a desired operation, indicated by the command data. If a desired operation indicates any one of operations requiring the MFP 1 to use a function of obtaining geographical data corresponding to the GPS data, the MFP 1 preferably performs the steps illustrated in FIG. 9.

Referring back to FIG. 9, Step S101 obtains GPS data, by extracting it from the received email data.

Step S105 searches through the geographical database, and defines a map corresponding to the obtained GPS data.

Figures 11, 12:
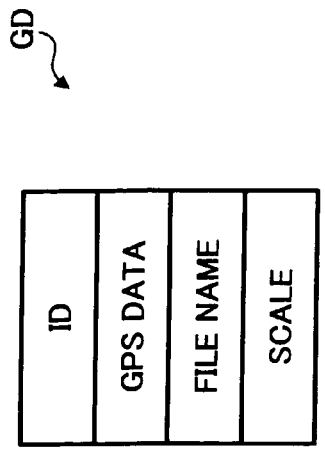
FIG. 11 is a table illustrating exemplary data items stored in a geographical database according to an exemplary embodiment of the present invention.
FIG. 12 is a table illustrating exemplary data items stored in a geographical database according to an exemplary embodiment of the present invention.

As shown in FIG. 11, the exemplary geographical database GD stores ID data, GPS data, file name data, and scale data, in a corresponding manner, for each of maps stored in the HDD 34 of the MFP 1.

The ID data represents an identification number, which may be used to identify a map. The GPS data includes longitude data indicating the longitude of a central coordinate shown in a map, and latitude data indicating the latitude of a central coordinate shown in a map. The file name data represents a file name assigned to a map. The scale data represents a spatial scale of a map.

To find a map showing the destination place, the MFP 1 extracts the longitude data and the latitude data from the received GPS data. With the longitude and latitude data, a coordinate indicating the destination place can be specified.

The MFP 1 searches the geographical database for a map including the specified coordinate, by checking the GPS data of each map. As a result, one or more maps are selected as candidate maps, as illustrated in FIG. 12, for example.

Step S106 of FIG. 9 selects a map, which may be most appropriate for showing the destination place, from the candidate maps. For example, the MFP 1 selects a map, including the specified coordinate near its central coordinate.

Step S107 adjusts the central coordinate of the selected map to be closer to the specified coordinate.

Step S112 outputs the selected map according to the command data.

In one example, if the email data is addressed to the printing email address, the MFP 1 prints the selected map using the printer 7.

Figure 13:
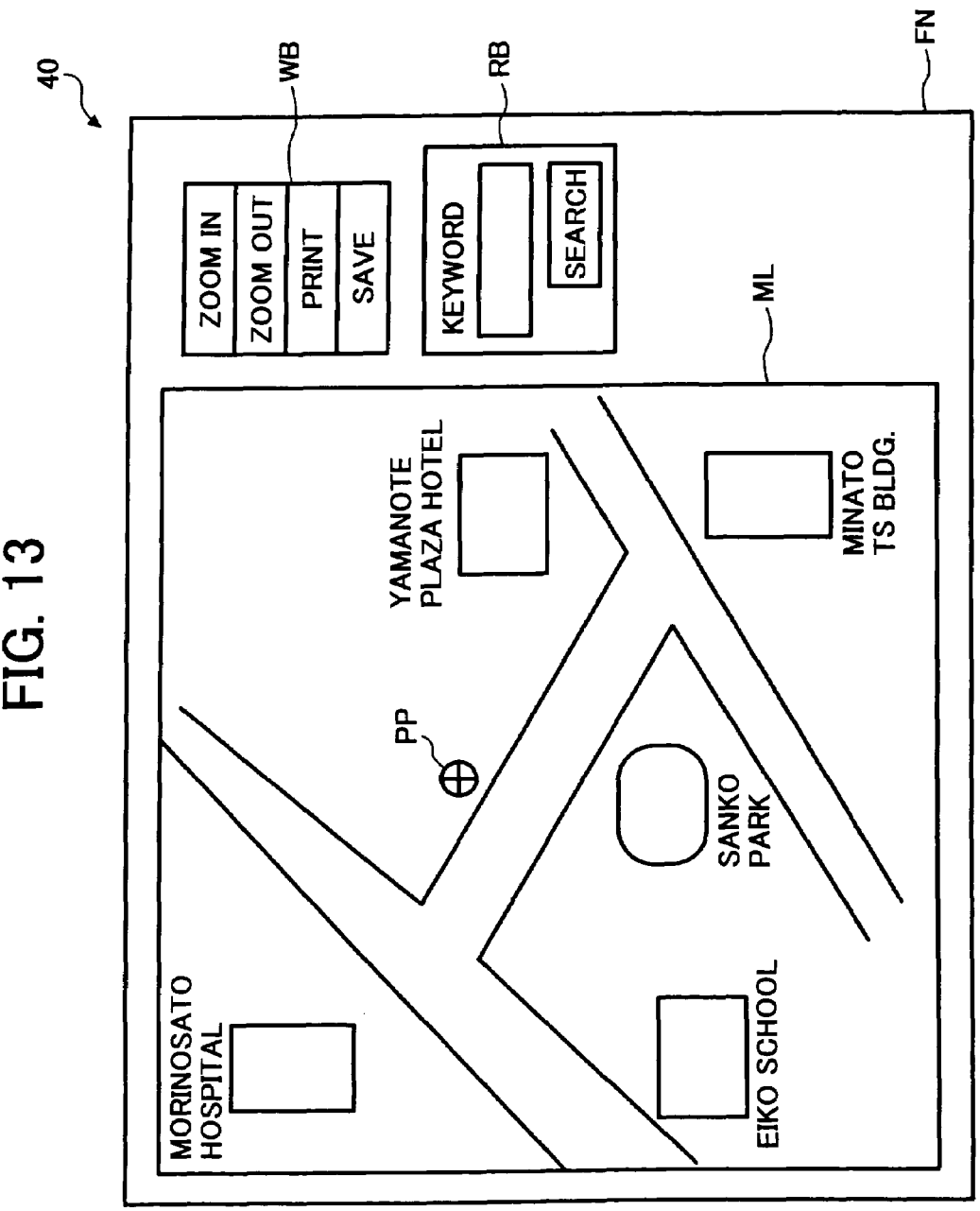
FIG. 13 is a front view illustrating exemplary geographical data displayed by the geographical data providing apparatus of FIG. 4.

In another example, if the email data is addressed to the displaying email address, the MFP 1 displays the selected map on the display 40, as illustrated in FIG. 13.

In another example, if the email data is addressed to the storing email address, the MFP 1 stores the selected map in the HDD 34, for example.

In another example, if the email data is addressed to the faxing email address, the MFP 1 faxes the selected map to a destination phone number, using the fax controller 20.

Further, the MFP 1 may continue to perform one or more operations after completing Step S112.

For example, after displaying the selected map shown in FIG. 13, the user may change the scale of the map, by selecting the "Zoom in" button or the "Zoom out" button, provided on the touch panel 41a. In another example, the user may print the selected map, by selecting the "Print" button. In another example, the user may save the selected map, by selecting the "Save" button. In another example, the user may further search another place in the map, by inputting a keyword into the "Keyword" field, and selecting the "Search" button.

In this exemplary embodiment, the steps shown in FIG. 9 may be performed in a different order. Further, an operation of selecting a map may be performed differently, preferably, depending on the geographical data obtaining program to be operated by the MFP 1.

Figure 14:
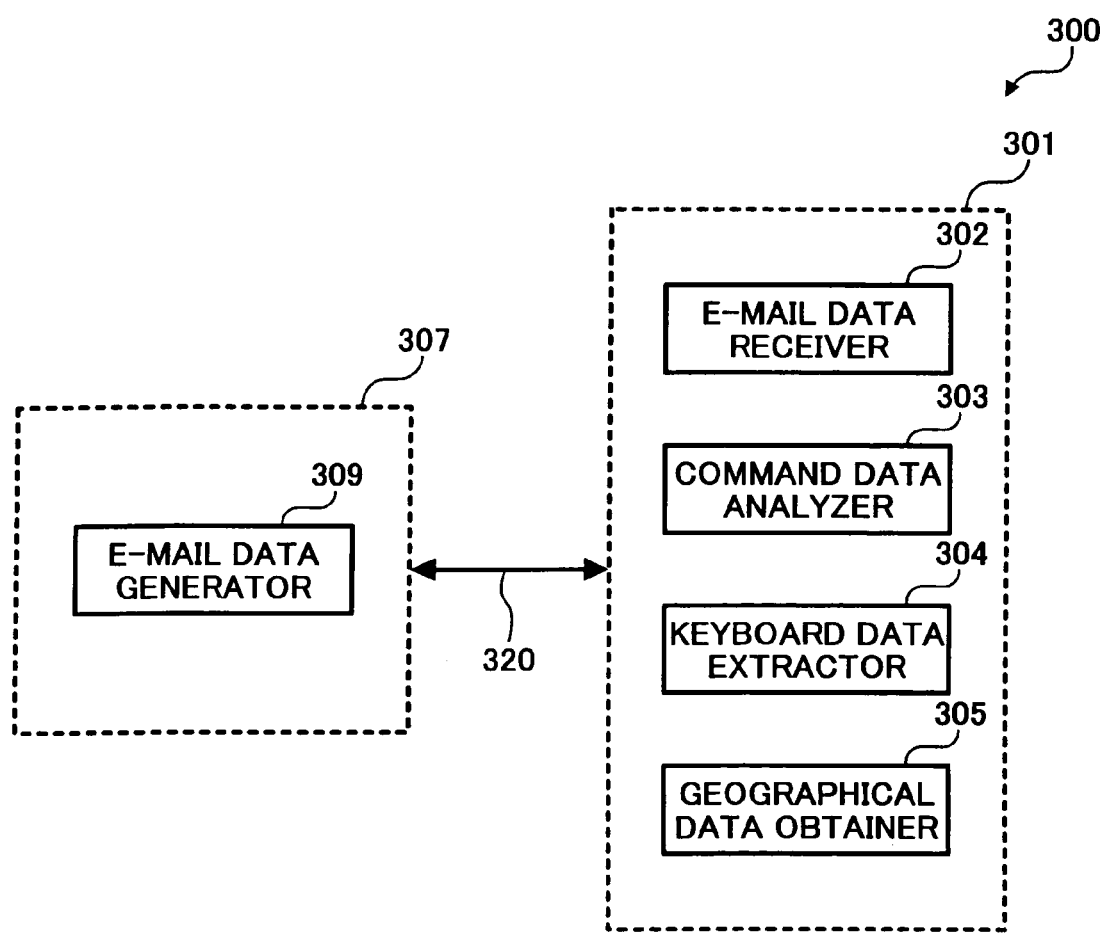
FIG. 14 is a schematic block diagram illustrating a functional structure of a geographical data providing system according to an exemplary embodiment of the present invention.

Now, referring to FIG. 14, a geographical data providing system 300 according to another exemplary embodiment of the present invention is explained.

The geographical data providing system 300 includes a geographical data providing apparatus 301 and a communication terminal 307, which are connected to each other via a network 320, such as the Internet.

The geographical data providing apparatus 301 is substantially similar in structure to the geographical data providing apparatus 101 of FIG. 1. The differences include the keyword data extractor 304.

The communication terminal 307 is substantially similar in structure to the communication terminal 107 of FIG. 1, however it is not provided with the spatial data receiver 108.

The email data generator 309 generates email data including keyword data and command data. The keyword data includes any kind of information, expressed in character, numeral, or symbol, which indicates a selected place. Examples of keyword data include an address, phone number, station name, sightseeing spot, etc. Preferably, the keyword data is included in the body of an email message.

The email data receiver 302 receives the email data from the communication terminal 307 via the network 320.

The command data analyzer 303 analyzes the command data, which indicates a desired operation.

The keyword data extractor 304 extracts the keyword data from the email data, and obtains spatial data corresponding to the extracted keyword data. Preferably, the spatial data is obtained by searching a keyword database available to the geographical data providing apparatus 301.

The geographical data obtainer 305 obtains geographical data corresponding to the spatial data.

The communication terminal 307 may be preferably implemented by any kind of mobile communication terminal, such as a mobile phone or a mobile computer, as long as it has a function of generating and sending email data.

The geographical data providing apparatus 301 may be preferably implemented by an MFP, having a structure substantially similar to the one shown in FIG. 5. To operate as the geographical data providing apparatus 301, however, the MFP 1 of FIG. 5 additionally has a function of extracting keyword data from email data, and a function of relating the extracted keyword data to spatial data. For example, the HDD 34 is additionally provided with a keyword data extracting program and a keyword database.

Figure 15:
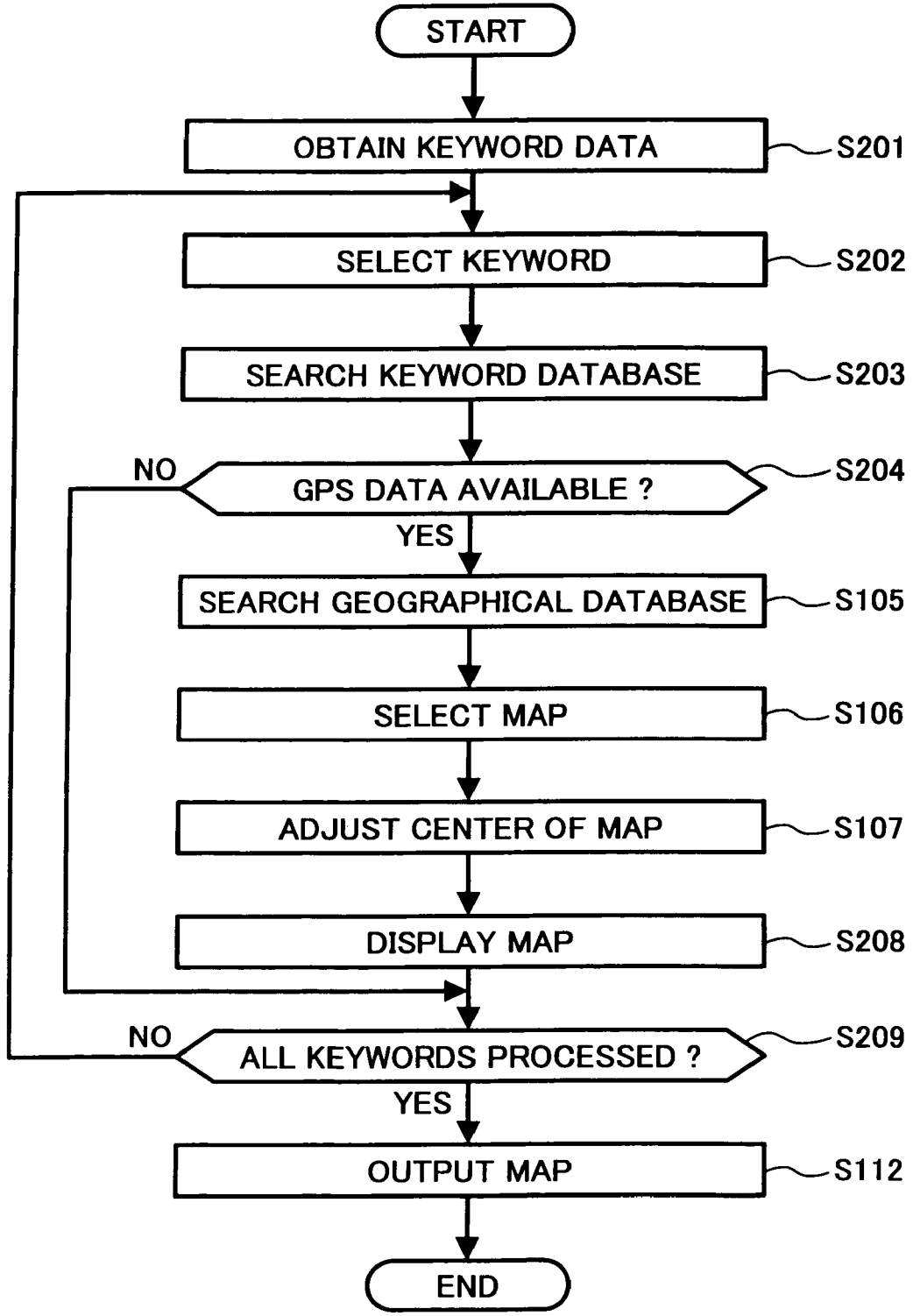
FIG. 15 is a flowchart illustrating an exemplary operation of outputting geographical data, performed by a geographical data providing apparatus shown in FIG. 14.

Now, referring to FIG. 15, an exemplary operation of outputting geographical data, performed by the geographical data providing apparatus 301, is explained.

For descriptive purpose, the geographical data providing apparatus 301 is assumed to have the structure shown in FIG. 4 (however, with the above-described additional functions), while the communication terminal 307 is assumed to have the structure shown in FIG. 2 (however, without the GPS data receiver). Further, in this exemplary embodiment, the MFP 1 and the mobile phone 70 are incorporated in the system shown in FIG. 8. Furthermore, the MFP 1 is assumed to output a map of a destination place, according to an instruction received from a user through the mobile phone 70.

In this exemplary embodiment, the email data is created by the mobile phone 70 as follows.

First, a user calls the email function by selecting the email key 70*f*, and generates email data including keyword data and command data.

The keyword data may be included in the body of an email message, or it may be attached to an email message as an attachment file. Preferably, the keyword data is generated in a form of text data, as illustrated in FIG. 16. As shown in FIG. 16, the email message ML includes a plurality of words expressing or implying a specific place.

Next, the user adds the command data. For example, the user may include a desired operation in the body of the email message. Alternatively, the user may select a specific email address for a desired operation in a substantially similar manner as described referring to FIG. 9.

In this exemplary embodiment, keyword data, such as the email message ML of FIG. 16, may be generated by a different person, and sent to the user of the mobile phone 70.

The MFP 1 performs the steps illustrated in FIG. 15 upon receiving email data, including keyword data and command data, from the mobile phone 70 in a substantially similar manner as described referring to FIG. 10.

Referring back to FIG. 15, Step S201 obtains the keyword data, i.e., the email message, by extracting it from the received email data.

Step S202 extracts one or more keywords from the keyword data, i.e., the email message, and selects one keyword from the extracted keywords.

For example, if the email message ML of FIG. 16 is obtained, the MFP 1 extracts a plurality of keywords KW, as illustrated in FIG. 17. The MFP 1 then selects one keyword, such as "Landmark Tower", for example.

Step S203 searches through the keyword database to see if any spatial data exists, which corresponds to the selected keyword.

As shown in FIG. 18, the exemplary keyword database KD stores keyword data and GPS data in a corresponding manner for each of maps stored in the HDD 34.

In this exemplary embodiment, the keyword data includes information indicating names of the stations shown in a map, information indicating names of sightseeing spots shown in a map, information indicating names of locations shown in a map, and information indicating names of public facilities shown in a map. In addition, the keyword data may include information indicating names of shops or restaurants shown in a map, information indicating names of roads shown in a map, information indicating phone numbers or zip codes relating to the locations shown in a map, etc.

In one example, if the word "Tokyo station" is selected, the MFP 1 searches for any GPS data corresponding to the word "Tokyo station" through the keyword database KD illustrated in FIG. 19, for example. If the word "Tokyo station" is found, the MFP 1 extracts GPS data, including longitude data indicating the longitude of the Tokyo station and latitude data indicating the latitude of the Tokyo station.

In another example, if the word "Bay Bridge" is selected, the MFP 1 searches for any GPS data corresponding to the word "Bay Bridge" through the keyword database 104 illustrated in FIG. 20, for example. If the word "Bay Bridge" is found, the MFP 1 extracts GPS data, including longitude data indicating the longitude of the Bay Bridge and latitude data indicating the latitude of the Bay Bridge.

Step S204 determines whether GPS data is available for the selected keyword. If the GPS data for the keyword is found in Step S203, the process proceeds to Step S105. If the GPS data for the keyword is not found in Step S203, the process proceeds to Step S209.

With this longitude data and the latitude data, a coordinate indicating the place defined by the selected keyword can be specified.

Step S105 searches through the geographical database GD, and defines a map including the specified coordinate, for example, by checking the GPS data of each map. As a result, one or more candidate maps can be selected.

Step S106 selects a map, which may be most appropriate for showing the place defined by the selected keyword, from the candidate maps.

Step S107 adjusts the central coordinate of the selected map to be closer to the specified coordinate.

Figure 21:
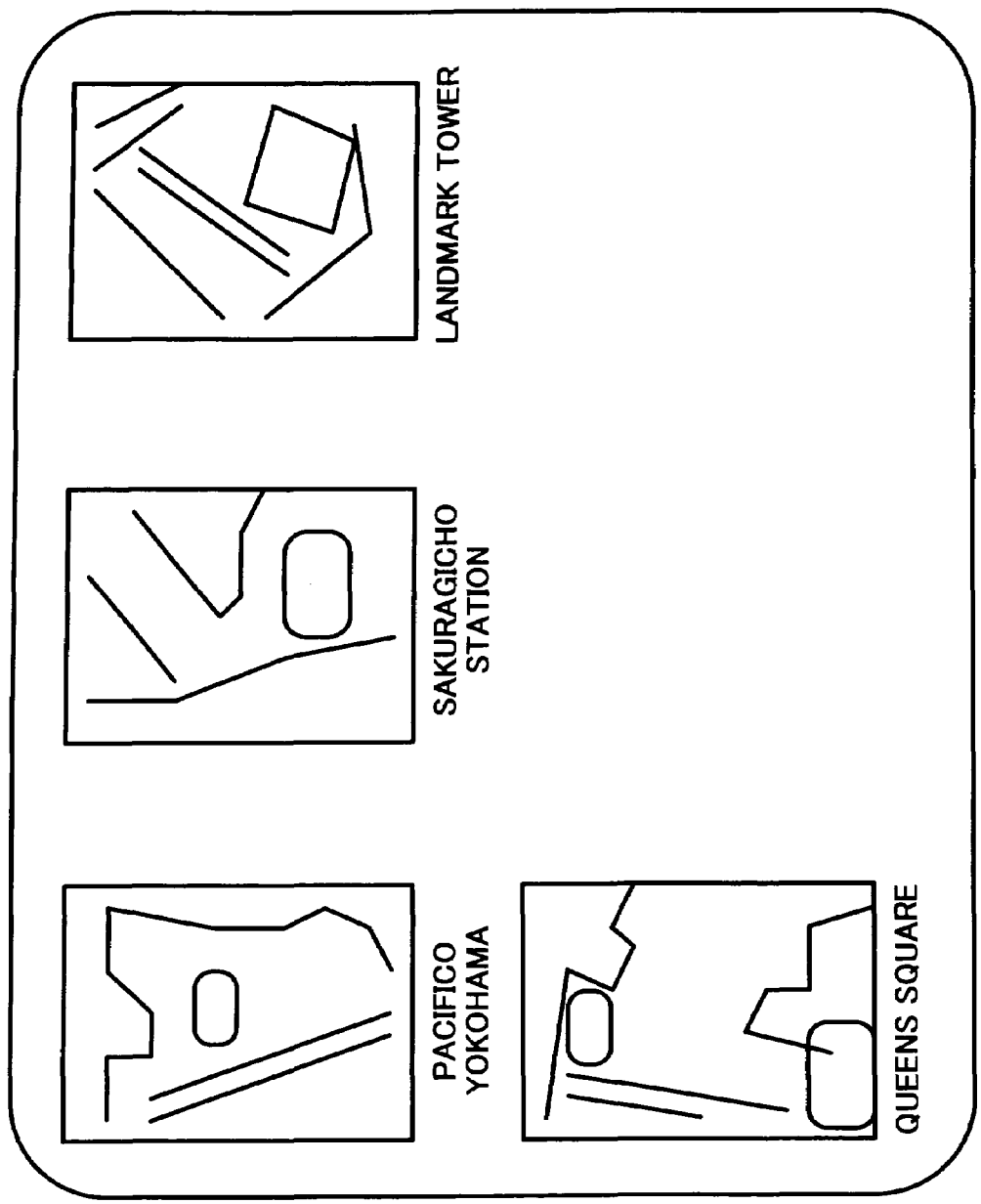
FIG. 21 is a front view illustrating exemplary geographical data displayed by the geographical data providing apparatus of FIG. 14.

Step S208 displays the selected map on the display 40. Preferably, the MFP 1 displays the selected map in a thumbnail image along with the selected keyword, as illustrated in FIG. 21.

Step S209 determines whether all keywords, which have been extracted in Step S202, are processed. If a keyword to be processed still exists, No in step S209, the process returns to Step S202 to select a next keyword. Otherwise, the process proceeds to Step S112.

Step S112 outputs the selected map according to the command data.

In this exemplary embodiment, the MFP 1 receives keyword data and command data in a form of email data, however the MFP 1 may receive keyword data and command data in any other kinds of data formats.

For example, if the mobile phone 70 is provided with a web browser, the mobile phone 70 may connect to a web page specified by the MFP 1 to input keyword data, and causes the MFP 1 to perform the above-described operation.

Further, the steps illustrated in FIG. 15 may be performed in a different order, or the operation of selecting a map may be performed differently, preferably, depending on the geographical data obtaining program to be operated by the MFP 1.

Figure 22:
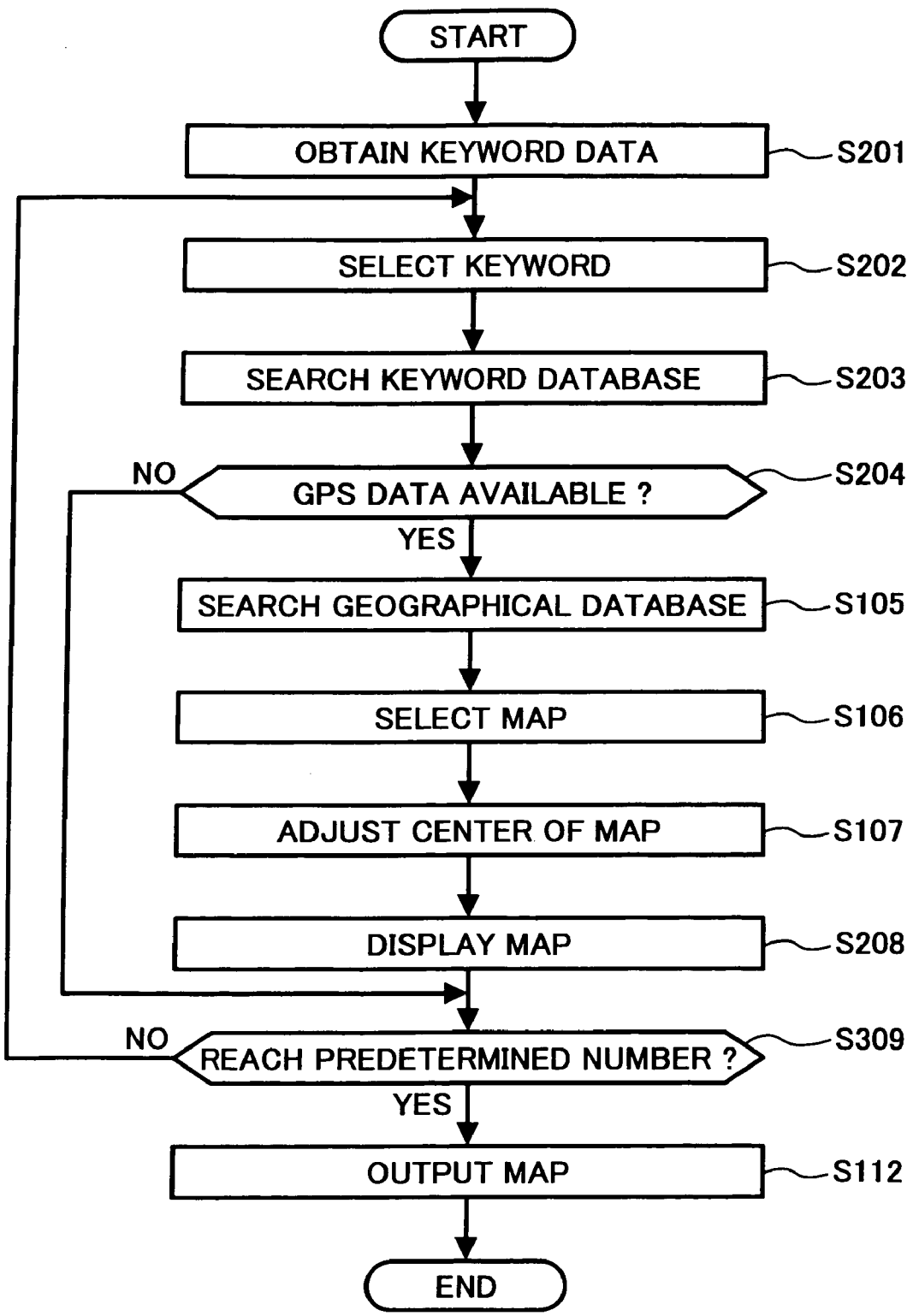
FIG. 22 is a flowchart illustrating an exemplary operation of outputting geographical data, performed by the geographical data providing apparatus shown in FIG. 14.

Referring to FIG. 22, another exemplary operation of outputting geographical data, performed by the geographical data providing apparatus 301, is explained.

The operation shown in FIG. 22 is substantially similar to the operation shown in FIG. 15, except for Step S309 replacing Step S209. Step S309 determines whether the number of keywords being processed reaches a predetermined number. In this way, the number of maps to be displayed may be limited.

Figure 23:
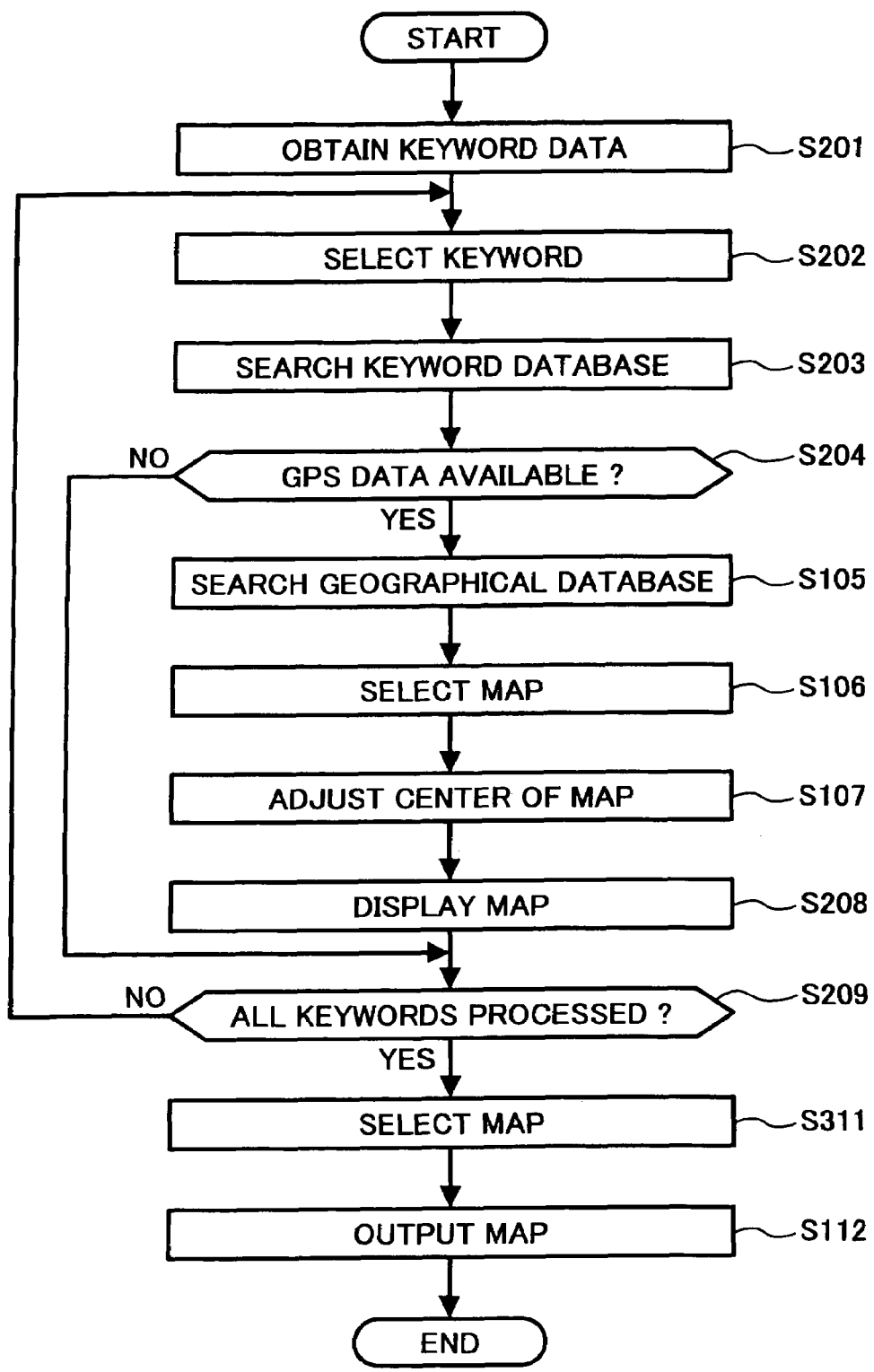
FIG. 23 is a flowchart illustrating an exemplary operation of outputting geographical data, performed by the geographical data providing apparatus shown in FIG. 14.

Referring to FIG. 23, another exemplary operation of outputting geographical data, performed by the geographical data providing apparatus 301, is explained.

The operation shown in FIG. 23 is substantially similar to the operation shown in FIG. 15, except for the addition of Step S311.

Step S311 selects a map to be output from a plurality of maps displayed on the display 40, for example.

If the keywords KW of FIG. 17 are processed, the display 40 displays four maps illustrated in FIG. 21, including a map showing the "Pasifico Yokohama Convention Center", a map showing the "Sakuragicho Station", a map showing the "Landmark Tower", and a map showing the "Queens Square Mall". The user may select one or more of the maps being displayed, using the input 41.

Numerous additional modifications and variations are possible in light of the above teachings. It is therefore to be understood that within the scope of the appended claims, the disclosure of this patent specification may be practiced otherwise than as specifically described herein.

For example, elements and/or features of different illustrative embodiments may be combined with each other and/or substituted for each other within the scope of this disclosure and appended claims.

Furthermore, any one of the operations mentioned above may be embodied in the form of a computer program. In such a case, the computer program is preferably stored in a storage device of the geographical data providing apparatus, which is readable to the processor (CPU 31 of the MFP 1 or CPU of the PC 52, for example) of the geographical data providing apparatus).

When the processor is activated, the processor loads the computer program onto its work memory and performs any one of the above-described operations.

The storage device includes any kind of memory, such as a built-in memory installed in the geographical data providing apparatus or a removable memory separable from the geographical data providing apparatus. Alternatively, the computer program may be downloaded via a network to be stored in the storage device.

What is claimed is:

1. A geographical data providing apparatus, comprising:
   a network device configured to receive email data including spatial data and command data from a communication terminal via a network, the command data being input from a header section of the email data;
   a storage device configured to store a plurality of geographical data items, a geographical database, and a plurality of account names previously assigned to the geographical data providing apparatus, the plurality of account names including an account name indicating a print command and an account name indicating a display command; and
   a controller configured to analyze whether the command data corresponds to at least one of the plurality of account names stored in the storage device, to search the geographical database for at least one geographical data item corresponding to the spatial data when the command data corresponds to at least one of the plurality of account names stored in the storage device, to cause printing of the at least one geographical data item when the command data corresponds to the account name indicating the print command, and to cause a display of the at least one geographical data item when the command data corresponds to the account name indicating the display command.

2. The apparatus of claim 1, wherein the command data is input as an email address of the email data that corresponds to at least one of the plurality of account names being stored in the storage device.

3. The apparatus of claim 1, further comprising:
   an output device configured to output the searched geographical data item according to the command data.

4. The apparatus of claim 1, wherein the plurality of account names further comprises an account name indicating a save command and an account name indicating a fax command, and wherein the controller is further configured to cause saving of the at least one geographical data item when the command data corresponds to the account name indicating the save command, and to cause faxing of the at least one geographical data item when the command data corresponds to the account name indicating the fax command.

5. The apparatus of claim 1, wherein the at least one geographical data item includes a plurality of geographical data items each indicating a different location, and wherein the controller is further configured to cause a display of a plurality of images respectively corresponding to the plurality of geographical data items, to receive a user input selecting one of the plurality of images respectively corresponding to the plurality of geographical data items, and to cause printing of the selected one of the plurality of images respectively corresponding to the plurality of geographical data items.

6. A geographical data providing apparatus, comprising:
   a network device configured to receive email data including keyword data and command data from a communication terminal via a network, the command data being input from a header section of the email data;
   a storage device configured to store a plurality of geographical data items, a geographical database, a keyword database, and a plurality of account names previously assigned to the geographical data providing apparatus, the plurality of account names including an account name indicating a print command and an account name indicating a display command; and
   a controller configured to analyze whether the command data corresponds to at least one of the plurality of account names stored in the storage device, to extract at least one keyword from the keyword data when the command data corresponds to at least one of the plurality of account names stored in the storage device, to search the keyword database for spatial data corresponding to the extracted keyword, to search the geographical database for at least one geographical data item corresponding to the searched spatial data, to cause printing of the at least one geographical data item when the command data corresponds to the account name indicating the print command, and to cause a display of the at least one geographical data item when the command data corresponds to the account name indicating the display command.

7. The apparatus of claim 6, wherein the command data is input as an email address of the email data that corresponds to at least one of the plurality of account names being stored in the storage device.

8. The apparatus of claim 6, further comprising:
   an output device configured to output the searched geographical data item according to the command data.

9. The apparatus of claim 6, wherein the plurality of account names further comprises an account name indicating a save command and an account name indicating a fax command, and wherein the controller is further configured to cause saving of the at least one geographical data item when the command data corresponds to the account name indicating the save command, and to cause faxing of the at least one geographical data item when the command data corresponds to the account name indicating the fax command.

10. The apparatus of claim 6, wherein the at least one geographical data item includes a plurality of geographical data items each indicating a different location, and wherein the controller is further configured to cause a display of a plurality of images respectively corresponding to the plurality of geographical data items, to receive a user input selecting one of the plurality of images respectively corresponding to the plurality of geographical data items, and to cause printing of the selected one of the plurality of images respectively corresponding to the plurality of geographical data items.

11. A geographical data providing apparatus, comprising:
means for receiving email data including spatial data and command data from a communication terminal via a network, the command data being input from a header section of the email data;
means for storing a plurality of account names previously assigned to the geographical data providing apparatus, the plurality of account names including an account name indicating a print command and an account name indicating a display command;
means for analyzing whether the command data corresponds to at least one of the plurality of account names stored in the means for storing to determine a desired operation;
means for obtaining geographical data corresponding to the spatial data when the command data corresponds to at least one of the plurality of account names stored in the means for storing; and
means for applying the desired operation to the geographical data, the desired operation including causing printing of the at least one geographical data item when the command data corresponds to the account name indicating the print command, and the desired operation including causing a display of the at least one geographical data item when the command data corresponds to the account name indicating the display command.

12. A geographical data providing apparatus, comprising:
means for receiving email data including keyword data and command data from a communication terminal via a network, the command data being input from a header section of the email data;
means for storing a plurality of account name previously assigned to the geographical data providing apparatus, the plurality of account names including an account name indicating a print command and an account name indicating a display command;
means for analyzing whether the command data corresponds to at least one of the plurality of account names stored in the means for storing to determine a desired operation;
means for obtaining geographical data corresponding to the keyword data when the command data corresponds to at least one of the plurality of account names stored in the means for storing; and
means for applying the desired operation to the geographical data, the desired operation including causing printing of the at least one geographical data item when the command data corresponds to the account name indicating the print command, and the desired operation including causing a display of the at least one geographical data item when the command data corresponds to the account indicating the display command.

13. A geographical data providing method, comprising:
assigning a plurality of account names, the plurality of account names including an account name indicating a print command and an account name indicating a display command;
receiving email data including keyword data and command data from a communication terminal via a network, the command data being input from a header section of the email data;
analyzing whether the command data corresponds to at least one of the plurality of account names to determine a desired operation;
extracting at least one keyword from the keyword data when the command data corresponds to at least one of the plurality of account names;
obtaining geographical data corresponding to the extracted at least one keyword; and
applying the desired operation to the geographical data, the desired operation including causing printing of the at least one geographical data item when the command data corresponds to the account name indicating the print command, and the desired operation including causing a display of the at least one geographical data item when the command data corresponds to the account name indicating the display command.

14. The method of claim 13, further comprising:
outputting the obtained geographical data according to the command data.

15. The method of claim 13, further comprising:
displaying a plurality of images respectively corresponding to a plurality of geographical data items when the at least one geographical data item includes the plurality of geographical data items each indicating a different location;
receiving a user input selecting one of the plurality of images respectively corresponding to the plurality of geographical data items; and
causing printing of the selected one of the plurality of images respectively corresponding to the plurality of geographical data items.

16. A computer readable medium storing computer executable instructions which, when executed on a computer, cause the computer to carry out a geographical data providing method, the geographical data providing method including:
assigning a plurality of account names, the plurality of account names including an account name indicating a print command and an account name indicating a display command;
receiving email data including keyword data and command data from a communication terminal via a network, the command data being input from a header section of the email data;
analyzing whether the command data corresponds to a least one of the plurality of account names to determine a desired operation;
extracting at least one keyword from the keyword data when the command data corresponds to at least one of the plurality of account names;
obtaining geographical data corresponding to the extracted at least one keyword; and
applying the desired operation of the geographical data, the desired operation including causing printing of the at least one geographical data item when the command data corresponds to the account name indicating the print command, and the desired operation including causing a display of the at least one geographical data item when the command data corresponds to the account name indicating the display command.

17. The computer readable medium of claim 16, the geographical data providing method further comprising:
outputting the obtained geographical data according to the command data.

18. The medium of claim 16, wherein the geographical data providing method further comprises:
displaying a plurality of images respectively corresponding to a plurality of geographical data items when the at least one geographical data item includes the plurality of geographical data items each indicating a different location;
receiving a user input selecting one of the plurality of images respectively corresponding to the plurality of geographical data items; and causing printing of the selected one of the plurality of images respectively corresponding to the plurality of geographical data items.

19. An information processing apparatus, comprising:

a processor;

a storage device configured to store a plurality of account names including an account name indicating a print command and an account name indicating a display command;

a storage device configured to store a plurality of instructions which, when activated by the processor, cause the processor to perform a geographical data providing operation, including:

receiving email data including spatial data and command data from a communication terminal via a network, the command data being input from a header section of the email data;

determining a desired operation defined by the command data by analyzing whether the command data corresponds to at least one of the plurality of account names stored in the storage device;

obtaining geographical data corresponding to the spatial data, when the command data corresponds to at least one of the plurality of account names; and applying the desired operation to the geographical data, the desired operation including causing printing of the at least one geographical data items when the command data corresponds to the account name indicating the print command, and the desired operation including causing a display of the at least one geographical data item when the command data corresponds to the account name indicating the display command.

20. An information processing apparatus, comprising:

a network device configured to store email data including spatial data in a mail box defined by an email address of the email data;

a storage device configured to store a plurality of account names including an account name indicating a print command and an account name indicating a display command; and a processor configured to perform, when activated by the network device, a geographical data providing operation including:

determining a desired operation defined by the email address of the email data by analyzing whether the email address of the email data corresponds to at least one of a plurality of account names stored in the storage device;

obtaining geographical data corresponding to the spatial data, when the email address of the email data corresponds to at least one of the plurality of account names; and applying the desired operation to the geographical data, the desired operation including causing printing of the at least one geographical data item when the email address of the email data corresponds to the account name indicating the print command, and the desired operation including causing a display of the at least one geographical data item when the email address of the email data corresponds to the account name indicating the display command.

21. An information processing apparatus, comprising:

a network device configured to store email data including keyword data in a mail box defined by an email address of the email data;

a storage device configured to store a plurality of account names including an account name indicating a print command and an account name indicating a display command;

a processor configured to perform, when activated by the network device, a geographical data providing operation including:

determining a desired operation defined by the email address of the email data by analyzing whether the email address of the email data corresponds to at least one of a plurality of account names stored in the storage device; and obtaining geographical data corresponding to the keyword data, when the email address of the email data corresponds to at least one of the plurality of account names; and applying the desired operation to the geographical data, the desired operation including causing printing of the at least one geographical data item when the email address of the email data corresponds to the account name indicating the print command, and the desired operation including causing a display of the at least one geographical data item when the email address of the email data corresponds to the account name indicating the display command.

* * * * *